Feb. 6, 1945.   H. R. LEGATSKI   2,369,058
DISTILLATION PROCESS
Filed March 6, 1942
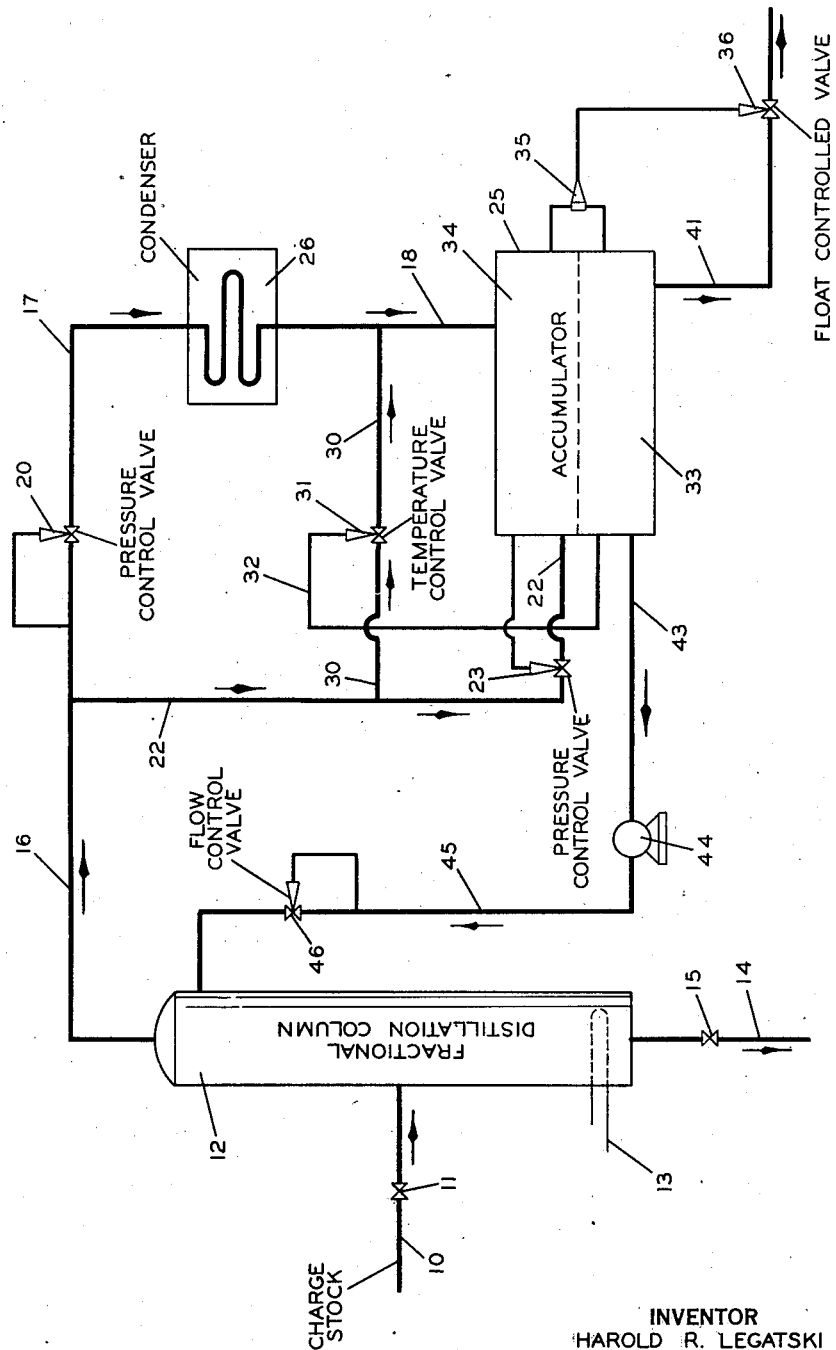
INVENTOR
HAROLD R. LEGATSKI
BY Hudson, Young & Yinger
ATTORNEYS

Patented Feb. 6, 1945

2,369,058

UNITED STATES PATENT OFFICE 2,369,058

DISTILLATION PROCESS

Harold R. Legatski, Bartlesville, Okla., assignor to Phillips Petroleum Company, a corporation of Delaware Application March 6, 1942, Serial No. 433,667

3 Claims. (Cl. 196—94)

This invention relates to improvements in the art of fractional distillation. More particularly it relates to the separation of selected fractions from mixtures containing substantial portions of material other than the desired material The separation of a mixture into its various components by fractional distillation means is well known in the art. Generally, in operating fractional distillation columns small variations in temperature, pressure, reflux ratio, and the like can be tolerated without appreciably affecting the quality of the overhead or other streams effluent from said column during steady operation. However, in some particular separations where a relatively small amount of material is separated and isolated by fractional distillation from a relatively large amount of undesired material admixed therewith and the boiling ranges of the desired and undesired material are near each other, a relatively high reflux ratio is necessary to bring about the desired separation and very close control of conditions such as temperature, pressure, reflux ratio, and the like is necessary to produce narrow boiling range fractions containing an optimum amount of the desired material.

Heretofore, the control afforded in operation of fractional distillation columns on a commercial scale has often not been precise enough to effect such separations and excessive amounts of undesired material were often admixed with a fraction of desired material even under heretofore optimum conditions of operation. Such lack of precise control particularly applies to existing methods for the separation by fractional distillation of close boiling fractions containing essentially normally liquid components. This applies particularly to material having a boiling point above about 115° F. at atmospheric pressure when cooling and condensation is effected by ordinary cooling water.

I have now found a new arrangement for effecting precise control in a fractional distillation system of the quality of a desired fraction by properly controlling in a novel manner the temperature and volume of reflux passed to a fractional distillation column and the pressure on said column, so that not only can a constant reflux ratio be maintained but also a constant temperature and rate of heat removal can readily be maintained.

An object of my invention is to separate fractions of desired material and of narrow boiling range from mixtures containing undesired material.

Another object of my invention is to separate and isolate fractions, of narrow boiling range of desired material, from mixtures containing said desired material in small amounts together with undesired material of closely adjacent boiling point.

Still another object of my invention is to separate a narrow boiling range fraction containing a desired normally liquid material from a mixture containing said desired material in a relatively small amount.

A further object of my invention is to separate from a normally liquid hydrocarbon material a low-boiling hydrocarbon fraction of narrow boiling range and of simple composition.

Still another object of my invention is to provide an apparatus for carrying out the above objects.

Other objects and advantages of my invention will become apparent from the accompanying disclosure and description.

I have found my invention to be particularly applicable in the separation of desired hydrocarbons from mixtures containing them. It can be successfully applied to the fractional distillation of any mixture containing distillable components, such as organic mixtures which may comprise or contain alcohols, aldehydes, acids, organic halides, esters, ethers, amines, or any other materials capable of being fractionally distilled.

My invention will now be described in connection with the accompanying drawing which is a flow diagram illustrating a specific operation of a fractional distillation system. As has been stated, my invention will find application in the separation of many kinds of materials. The drawing will be discussed in connection with the separation of a selected hydrocarbon fraction from a mixture of hydrocarbons.

A hydrocarbon mixture, comprising isohexanes and higher boiling hydrocarbons and essentially free from $C_5$ and lower boiling hydrocarbons is passed to a fractional distillation column 12, through conduit 10 controlled by valve 11.

Fractionator 12 is operated to separate a low-boiling isohexane fraction from the mixture charged thereto, and may be any suitable fractional distillation column. The top of fractionator 12 is operated at predetermined conditions of temperature and pressure and such conditions are maintained substantially constant. An isohexane fraction in the vapor state is passed overhead through conduit 16, back-pressure control valve 20, conduit 17 cooler and total condenser 26, and conduit 18 to reflux accumulator 25.

Valve 20 is for controlling the pressure in the column at a substantially constant predetermined value, and is responsive to the pressure in conduit 16, as diagrammatically illustrated.

At least a portion of the liquid from reflux accumulator 25 is passed through conduit 43 by a pump 44 and is returned as reflux to the top of fractionator 12 through conduit 45 and flow-control valve 46. A low-boiling isohexane fraction, recovered as a product of the process, is removed from accumulator 25 through conduit 41 and level control valve 36, which is in communication with the level of the liquid in accumulator 25 through float mechanism 35.

Hydrocarbon material having a higher boiling range than that removed through overhead conduit 16 and comprising substantially any and all normal hexane together with any higher boiling hydrocarbon charged to fractionator 12 can be removed from the fractionator through conduit 14 controlled by valve 15. Heat is supplied to fractionator 12 by means of heating coil 13.

For the successful isolation of a low-boiling isohexane fraction of desirable quality and narrow boiling range, such as through conduit 41, the predetermined operating pressure and temperature for the fractionating column 12 and particularly the top section of the column should be maintained at essentially constant values during long periods of continuous operation. Although the conditions may be at any value within a substantial range, once the operating conditions are selected, the temperature in the top of the column should not vary more than a fraction of one degree Fahrenheit, and the pressure should not vary more than a fraction of one pound per square inch.

In order to exert such close control on temperature and pressure conditions in the top of fractionator 12 it is important in my arrangement that essentially all of the overhead material passing through condenser 26 be completely condensed and cooled several degrees below its condensation temperature and that the material effluent from condenser 26 and before it reaches the juncture with conduit 30 be at a temperature substantially lower than the temperature desired for the material in the liquid phase in accumulator 25. For a distillation such as is being particularly discussed, the cooling and condensing effected by condenser 26 is normally obtained by the use of cooling water in an atmospheric cooling tower, and variations in atmospheric temperature and in the temperature of the cooling water from one part of the day to another have heretofore varied the temperature of the material effluent from condenser 26 and, hence, the temperature of the condensate which reached the accumulator, and of the reflux returned to the column. However, according to my arrangement, the temperature of the liquid in the accumulator 25 can be successfully controlled and maintained substantially constant by a temperature control valve 31 in conduit 30, which admits uncondensed vapor to the condensate in conduit 18.

Valve 31 is actuated by a controller which is responsive to the temperature of the liquid phase 33 by means of communicating means 32. When the temperature of the liquid phase 33 in accumulator 25 tends to be less than a predetermined minimum value, said value being dependent upon the temperature of the reflux desired in column 12, control valve 31 opens, thereby allowing uncondensed hot vapors from conduit 16 to pass through conduit 22 and conduit 30 to be admixed and liquefied with cooled material from condenser 26. Since I prefer to operate my fractionation system in such a manner that material directly effluent from condenser 26 is always at a temperature substantially lower than the temperature of the material in the liquid phase in accumulator 25, valve 31 is opened to such an extent that some material always flows therethrough and particularly when steady state operation is attained. The predetermined and desired temperature of the liquid phase in accumulator 25 can be attained when a minimum but appreciable amount of vaporous material is flowing through valve 31.

In some instances communicating means 32 may be arranged in my system so as to be responsive to the temperature in conduit 17 and in communication therewith at a position which is in the direction of the accumulator from the juncture of conduits 30 and 18. My system can be arranged in the manner shown when the time of residence of liquid phase in accumulator 25 is relatively short, as is often the case.

The amount of reflux liquid passed by reflux pump 44 through conduit 45 is dependent to some extent upon the pressure head on pump 44 which in turn is directly dependent on the pressure existing in accumulator 25 on the surface of the liquid phase.

In fractionation systems known to the art, when the pressure in a reflux accumulator varied, as a result of temperature changes or other reasons, output of a reflux pump taking suction from such an accumulator varied accordingly. Although this usually could be satisfactorily controlled within a selected range by a flow controller in the discharge conduit, such as shown in the drawing by flow-control valve 46, such control in itself, is not effective over a wide enough range nor does it provide great enough safety in a distillation system.

In addition, there has always been the constant danger that a large type of such an accumulator would not be able to withstand such a variation. In several particular instances, when a large accumulator in use as discussed was suddenly cooled by atmospheric conditions, such as a rainstorm, it has collapsed before simple temperature control, as afforded by valve 31 alone, could increase the vapor pressure in such an accumulator.

In order to insure a minimum pressure variation in accumulator 25, conduit 22 communicates between conduit 16 and the vapor space 34 in accumulator 25. A pressure control valve 23 is located in conduit 22 and is responsive to the vapor pressure in the accumulator. When the pressure in accumulator 25 tends to decrease below a predetermined value, such as by external cooling of the accumulator or by other means, the controller, being so adjusted beforehand, opens valve 23 thereby allowing vapor at a higher pressure than the pressure existing in accumulator 25 to enter the vapor space of said accumulator, through conduit 22 above the surface of the liquid, thereby preventing the pressure in the accumulator from decreasing. I prefer to operate my fractionating system in such a manner that some vapor material flows through valve 23 at all times during steady operation thereby maintaining a constant positive pressure on the surface of the liquid in accumulator 25, and the pressure so maintained being the predetermined and desired pressure in the accumulator. This pressure will be slightly above the vapor pressure of the liquid 33 at the temperature employed, but should not be such that excessive amounts of vapor are condensed in the liquid from this vapor phase.

Pump 44 is usually so designed that it is capable of a somewhat greater output than the actual output which is desired during normal operation. Using a pump having such a capacity, I prefer to employ a flow control valve 46 in conduit 45 which will regulate the amount of material flowing therethrough so that said amount of material is substantially constant throughout continuous operation. The control of flow of reflux liquid in conduit 45 is further facilitated, however, by effecting the regulation of the pressure in the accumulative as discussed.

In actual operation, by far the greater amount of vapors from the top of column 12 and conduit 16 will pass through valve 20 and conduits 17 and 18, so that variations in the amount passed through conduit 22 from conduit 16 will be relatively small and will not upset or appreciably affect the pressure at the top of column 12.

The combined use of the arrangement described for maintaining a constant pressure on the fractional distillation column, a constant temperature of the liquid in the reflux accumulator, and a constant pressure in the reflux accumulator provides very satisfactory operation when fairly extreme variations in the temperature of the cooling medium for the cooling and condensation, and also when the reflux accumulator itself may be subjected to rapid temperature changes. Both of these situations are often met in commercial operations, particularly in the fractionation of motor-fuel range hydrocarbons to produce fractions having a narrow boiling range, such as 5 to 15° F. When a well insulated reflux accumulator is assured, the use of the pressure control feature, whereby vapors are directly injected into the vapor space of the accumulator, may not be necessary; and when a constant temperature for the condensate is assured the temperature control feature, whereby the cooled condensate is warmed by admixture with uncondensed vapors, may not be necessary, as will be appreciated by those skilled in the art.

The following example illustrates a particular adaptation of my invention although it is not my intention to be unnecessarily limited in the scope of my invention by the specific arrangement and conditions discussed therein.

EXAMPLE

A hydrocarbon mixture containing substantially no hydrocarbons lower boiling than $C_7$ hydrocarbons is charged to fractionator 12 through conduit 10 controlled by valve 11. Such a mixture has the composition shown in Table I.

Table I

| | Per Cent Liquid Volume |
|---|---|
| Isoheptanes | 39.3 |
| Normal heptane | 21.6 |
| Isooctanes | 14.1 |
| Normal octane and heavier | 25.0 |
| | 100.0 |

By suitable adjustment of pressure control valve 20 and its cooperation with control valves 31 and 23 the pressure in the accumulator 25 is maintained at a substantially constant value of 8 pounds per square inch gauge. Variation from this value is only a fraction of one pound per square inch. The accumulator temperature is maintained substantially constant at 198° F. By the close control afforded by the cooperation of valves 20, 31 and 23 as discussed herein, variation from this value is less than one degree Fahrenheit. The kettle of fractionator 12 is operated at a temperature of 306° F. and a pressure of 30 pounds per square inch gauge. With a reflux ratio in the fractionator of 25 to 1 the temperature of the head of the fractionator is maintained within a fraction of a degree of 232° F. and by proper control of valve 46 in cooperation with valves 20, 31 and 23 the pressure in the head of the fractionator is maintained within a fraction of a pound of 22 pounds per square inch gauge.

Approximately 90,718 gallons per day of charge stock of the stated composition is passed to fractionator 12 through conduit 10. Characteristics of this charge stock are shown in column 1 of Table II. An isoheptane fraction in the vapor state and of high octane number is passed from the top of fractionator 12 through conduit 16, pressure control valve 20, cooler and condenser 26, and conduit 17 to reflux accumulator 25. A liquid from reflux accumulator 25 is passed through conduits 43 and 45 by pump 44 and thence to the top of fractionator 12 through valve 46. By using a reflux ratio of 25:1 an isoheptane fraction of narrow boiling range and other desirable characteristics is recovered as a product of the process through conduit 41 controlled by valve 36. The isoheptane fraction removed from fractionator 12 constitutes approximately 35,700 gallons per day and has the characteristics as shown in column 2 of Table II.

Table II.

| | 1 Charge to fractionator 12 | 2 Isoheptane fraction | 3 Kettle product |
|---|---|---|---|
| A. P. I. gravity | 59.1 | 60.0 | 57.9 |
| Boiling range °F.[1] | 185–456 | 169–183 | 214–454 |
| Reid vapor pressure | 2.0 | 3.17 | 1.05 |
| A. S. T. M. octane number: | | | |
| Clear | 57.4 | 76 | 45 |
| 3 cc. TEL | 70.6 | 89 | 58.9 |

[1] Boiling range under atmospheric pressure of 13.2 pounds per square inch absolute.

The kettle product from fractionator 12 amounts to approximately 55,018 gallons per day and comprises normal heptane and heavier hydrocarbons which are removed from the fractionator through conduit 14 controlled by valve 15. Such a kettle product has characteristics as shown in column 3 of Table II.

In the separation of an isoheptane fraction of such magnitude as exemplified from higher boiling material, conduit 16 has a diameter of approximately 24 inches and conduits 22 and 30 have diameters of approximately 6 inches.

It is to be understood that my process can be applied to any fractional distillation where the overhead vapors are subjected to total condensation. Many modifications of this invention may obviously be used, and can be adopted by one skilled in the art without departing from the spirit of the disclosure. The restrictions used in the example and in connection with the drawing, need not necessarily be used as limits for any particular operation or set of conditions as they are presented primarily as illustrative examples. It will be understood that the flow diagram presented and described herewith is schematic only and that other additional pieces of equipment and/or variations can be readily adopted for specific plant by one skilled in the art. The essential equipment and material flow have been described and discussed in sufficient detail to serve as an efficient guide.

I claim:

1. A process for continuous fractional distillation to remove from a mixture an overhead product of constant characteristics, which comprises passing such a mixture to a fractional distillation column, removing from the top of said column a vapor containing at least one component of said mixture, passing a major portion of said vapor through a back pressure control valve to a cooler and condenser, condensing all of said major portion of said vapor and cooling the resultant condensate to a temperature below that subsequently desired for a reflux to said column, admixing with the resultant condensate a minor portion of said vapor in an amount such as to produce a resultant liquid material at a desired temperature, passing said liquid to an accumulator containing a liquid space and a vapor space, passing to said vapor space a further minor portion of said vapor in an amount such as to maintain a desired essentially constant pressure in said accumulator greater than the vapor pressure of the liquid contained therein, passing a portion of the liquid from said accumulator to the top of said fractional distillation column as a reflux for said column, and recovering a further portion of the liquid from said accumulator as a product of the distillation.

2. In a process for continuous fractional distillation, the improvement which comprises completely condensing a major portion of a vaporous overhead effluent of a fractional distillation column to form a condensate, passing the resultant condensate to a reflux accumulator having a liquid space and a vapor space, passing a portion of the liquid from said reflux accumulator to the top of said fractional distillation column as reflux, controllably injecting into said condensate a minor portion of said vaporous effluent to maintain the resultant mixture at a constant desired reflux temperature, and controllably injecting into the vapor space of said accumulator a further minor amount of said vaporous effluent to maintain the resultant pressure at a constant value higher than the vapor pressure of the condensate.

3. A process for the continuous fractional distillation of a low-boiling normally liquid hydrocarbon mixture to obtain a desired hydrocarbon fraction boiling in the motor fuel range and having a boiling range not greater than about 15° F. which comprises, continuously charging to a fractional distillation column such a hydrocarbon mixture essentially free of hydrocarbon components lower boiling than said desired fraction to be obtained, continuously removing from the top of said column a vapor fraction corresponding to said desired fraction, completely condensing a major portion of said vapor fraction to form a condensate and cooling said condensate to a temperature lower than that subsequently desired for a reflux, injecting into said cooled condensate a controlled amount of a minor portion of said uncondensed vapor fraction to form a liquid hydrocarbon fraction at a constant and desired reflux temperature, passing said liquid fraction to an accumulator, maintaining in said accumulator a liquid level such that a substantial vapor space exists above the liquid fraction contained therein, continuously passing a further controlled minor portion of said uncondensed vapor fraction to said vapor space to maintain therein a constant and desired pressure, higher than the vapor pressure of the liquid contained in said accumulator, continuously passing a substantial and controlled portion of said liquid fraction of essentially constant temperature and constant pressure from said accumulator to the top of said column as reflux, and removing a further portion of said liquid fraction as a desired hydrocarbon product of said distillation.

HAROLD R. LEGATSKI.